Figure 1:
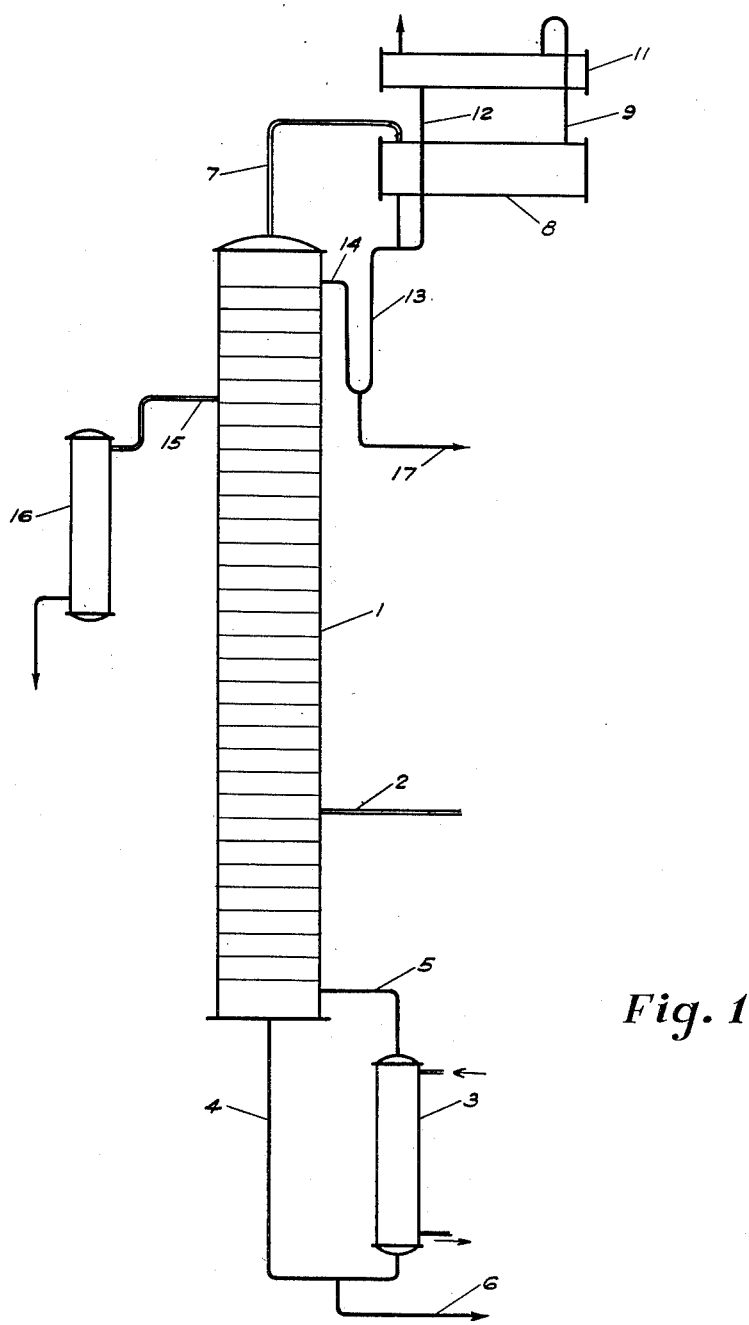

Nov. 18, 1952  E. D. UNGER ET AL  2,618,590
PROCESS OF PURIFYING HIGH-PROOF ALCOHOL
Filed Jan. 22, 1948

Inventors
EARL D. UNGER, LEROY A. SMITH
AND HERMAN F. WILLKIE
By
Arthur JRobert
Attorney Patented Nov. 18, 1952

2,618,590

UNITED STATES PATENT OFFICE 2,618,590

PROCESS OF PURIFYING HIGH-PROOF ALCOHOL

Earl D. Unger, Le Roy A. Smith, and Herman F. Willkie, Louisville, Ky., assignors to Joseph E. Seagram & Sons, Inc., Shively, Ky., a corporation of Indiana Application January 22, 1948, Serial No. 3,718

5 Claims. (Cl. 202—40)

This invention relates to the purification of high proof neutral spirits or other alcohols by rectification thereof.

High proof neutral spirits generally are obtained from fermented mashes of grains, molasses and the like by a series of distillations and rectifications to produce an alcohol closely approaching the azeotropic mixture, in which the fussel oils and other impurities have been reduced to a very small proportion. When such spirits are employed for beverage purposes for blending with aged whisky or the like, it generally is found necessary to subject the neutral spirits to an aging process similar to that employed for whisky, in order to eliminate the effect of impurities, so that a neutral spirit of the highest quality may be produced. The aging process is expensive because of the warehousing facilities required, the increase in inventory, aging losses, and other factors.

Heretofore, it has been proposed to improve the quality and proof of alcohol of various strengths by subjecting the alcohol to a rectification process in which the low boiling impurities are removed at the head end and the high boiling impurities are removed at the tail end of the column along with water or a dilute alcohol. However, generally, the best large scale rectification commercially employed fails to produce consistently alcohol of substantially the same quality as aged neutral spirits, and such inferior alcohols therefore have to be aged to produce the highest quality of neutral spirits.

It is an object of the present invention to improve the potable quality of neutral spirits by subjecting the same to a rectification treatment.

Another object is the provision of a process for purifying a water miscible alcohol containing a small proportion of impurities having a boiling point lying between that of the alcohol and water.

In accordance with the present invention, a high proof alcohol of about 188° proof or higher is rectified in a fractionating column in which the feed is introduced in an intermediate section of the column and the purified alcohol is withdrawn near the top of the column, with withdrawal of a high proof tails fraction, the rectification being carried out without addition of water. The alcohol thus produced is equal in quality to the best grades of aged neutral spirits, and may be used directly for blending with high quality whisky.

The high proof tails fraction withdrawn preferably has a boiling point between that of alcohol and of water, and lying closer to alcohol than to water, and may have a boiling point lying about four degrees or less above the boiling point of alcohol. The percentage of high proof tails fraction to feed may be selected as desired to remove the impurities concentrated therein, and in general we prefer to remove a relatively high proportion of tails fraction to feed to insure maximum removal of impurities.

In general, the limitation of the proof of the tails fraction to be withdrawn and the percentage of tails fraction to feed determines the design of the column to be employed and the minimum proof of feed to be introduced into the column. With a given design of column, the feed alcohol in general may be about 188° proof or higher, and the tails fraction removed may lie within a range of 110° proof or higher, depending on the composition of the feed, the composition of the product withdrawn from the column, and the ratio of volume of tails fraction withdrawn to the feed.

We believe that the residual impurities in the feed alcohol is of such nature that in the ordinary rectification process in which water or a dilute alcohol is removed at the bottom of the still, the impurities diffuse throughout the column and eventually are partially or entirely withdrawn with the product. An impurity boiling between the boiling point of water and azeotropic alcohol-water mixture, and miscible with both water and alcohol would behave in this manner. By conducting the distillation in such manner that the boiling point of the tails fraction is not higher than the boiling point of the impurities, the impurities accumulate at the base of the column and are removed in the tails fraction. In order to eliminate as much as possible the accumulation of the impurities in the column, a relatively large tails fraction is withdrawn, as this results in a low concentration of these impurities in the tails fraction and consequently there is a low proportion of impurities in the column. This is because the partial vapor pressure of the impurity bears a generally proportional relationship to the concentration of impurity at the bottom of the column. The process of the present invention will also result in the removal of most of the water immiscible alcohol miscible impurities boiling above the boiling point of water, or between the boiling points of alcohol and water, where such impurities are present in the feed alcohol because of incomplete previous removal in the ordinary rectification process.

Alcohol of 194.4° proof is an azeotropic mixture of alcohol and water containing about 4.43% water by weight, and has the lowest boiling point of any alcohol-water mixture at atmospheric pressure, and in rectifying such a mixture the tails fraction withdrawn will be 194.4° proof. When rectifying alcohol having a higher water content, the tails fraction will be of a lower proof, depending on the factors above pointed out. In general we have found that improved results can be obtained by treating alcohols of about 188° proof spirit or higher, and preferably by treating an alcohol of about 190 to 194.4° proof. Although the purified product obtained in this process may be of slightly higher proof than the alcohol fed into the rectifier, this advantage is considered by us as secondary, the principal advantage being the elimination of the impurities from the alcohol.

The invention will be described in greater detail in connection with the accompanying drawing in which the figure schematically shows a preferred apparatus for carrying out the invention.

Referring to the drawing, there is shown a long fractionating column 1 of any suitable construction, such as a bubble cap column, or the like, which in the preferred embodiment may have about sixty plates. Alcohol to be purified is continuously introduced by the inlet pipe 2, which preferably is located on about the twenty-sixth plate, and flows downwardly in the column. At the bottom heat is supplied externally through a calandria or heat exchanger 3, the alcohol being circulated thereto through a pipe 4 at the bottom of the column, and the vapors of alcohol enter through pipe 5 at the bottom of the column. A draw off line 6 may be provided at the bottom to draw off a tails fraction.

The vapors rise through the column and pass by line 7 to the condenser or dephlegmator 8 and thence by pipe 9 to the vented cooler 11, the condensate therefrom in line 12 being joined to the returning condensate in line 13 which enters the column at 14 on the top plate. Purified alcohol is continuously withdrawn at 15, from the fifty-first plate, which is a short distance below the point where the reflux enters the column, the purified alcohol being passed through a cooler 16 from which it flows to storage. If desired, a heads fraction draw off 17 may be provided.

In operation, assuming the process has been run long enough to establish equilibrium conditions, high proof alcohol of a strength of about 193° proof, is introduced at 2 and flows downwardly countercurrent to the ascending vapors produced by the calandria as they pass upwardly through the column, the vapors bubbling through the various plates and passing by pipe 7 to the condenser. The reflux is returned to the top plate of the column, and flows downwardly countercurrent to the ascending vapors over the plates in the column. The apparatus is operated at any suitable reflux to feed ratio for example, a range from about 2:1 to 8:1; a ratio of about four times the feed being preferred. However, the reflux ratio may be as high as eight to one, or even higher.

The high proof tails fraction equal to about ten per cent of the feed alcohol is continuously withdrawn at 6, this fraction containing a higher concentration of the odoriferous and gustatory impurities than the feed alcohol or the product withdrawn at 15. However, any suitable percentage of tails fraction may be withdrawn. This tail fraction will be about 183° proof, or higher, depending on the factors previously pointed out.

The purified alcohol of about 193.6° proof, is continuously withdrawn at 15 at a point intermediate the feed inlet 2 and the reflux return 14. If desired, a heads cut amounting to about five to ten per cent of the feed may be withdrawn at 17, especially where the feed alcohol contains some impurities of boiling point lower than that of the water-alcohol azeotrope. Ordinarily, the taste and odor of high proof rectified spirits are due to the higher boiling impurities, and where no substantial portion of such lower boiling impurities are present, no appreciable advantage is obtained by withdrawing a heads fraction.

The alcohol drawn off through the cooler 16 is of high quality and of excellent taste and odor, equal to the best aged high proof spirits, and may be employed without aging for blending with high quality aged whisky.

The process of the present invention is applicable to the purification of other water miscible alcohols boiling below water, such as isopropyl alcohol, and containing mutually miscible impurities having a boiling point between water and said alcohol. In the case of alcohols boiling above water and containing mutually miscible impurities boiling between the alcohol and water, the impurities will be removed as a heads fraction and the purified product would be removed at the bottom of the still.

Having described our invention, we claim:

1. The process of improving the taste and odor of an ethyl alcohol feed of at least 188° proof which contains residual amounts of impurities imparting a taste and odor thereto, which impurities, in a prior step of rectification of aqueous alcohol involving removal of water or a dilute alcohol as a bottom product, diffuse significantly in alcohol throughout the range of substantially zero proof up to at least the proof of the said feed alcohol, and which impurities have lesser volatility characteristics than alcohol at the proof of the product withdrawn in the process hereinafter recited. comprising: continuously feeding said alcohol into a rectifying column at a point intermediate the ends; vaporizing said alcohol by the indirect application of heat without substantial addition of water and passing vapors upwardly through the column; refluxing condensed vapors at the top of the column; continuously withdrawing product alcohol from above the point of introduction of feed alcohol at a proof no lower than the feed alcohol, and containing a lower concentration of said residual impurities than the feed alcohol; maintaining a concentration at the bottom of the column above about 110° proof; and continuously withdrawing from substantially the bottom of said column a portion above about 110° proof containing a higher concentration of said residual impurities than the feed alcohol.

2. The process of improving the taste and odor of an ethyl alcohol feed of at least 188° proof free from a significant amount of ethyl isobutyrate and which alcohol contains residual amounts of impurities imparting a taste and odor thereto, which impurities, in a prior step of rectification of aqueous alcohol involving removal of water or a dilute alcohol as a bottom product, diffuse significantly in alcohol throughout the range of substantially zero proof up to at least the proof of the said feed alcohol and which impurities have lesser volatility characteristics than alcohol at the proof of the product withdrawn in the process hereinafter recited, comprising: continuously feeding said alcohol not substantially below 188° proof into a rectifying column at a point intermediate the ends; vaporizing said alcohol by the indirect application of heat without substantial addition of water and passing vapors upwardly through the column; refluxing condensed vapors at the top of the column; continuously withdrawing product alcohol from above the point of introduction of feed alcohol at a proof no lower than the feed alcohol, and containing a lower concentration of said residual impurities than the feed alcohol; maintaining a concentration at the bottom of the column above about 110° proof; and continuously withdrawing from substantially the bottom of said column a portion above about 110° proof containing a higher concentration of said residual impurities than the feed alcohol.

3. The process of improving the taste and odor of an ethyl alcohol feed of at least 188° proof which contains residual amounts of impurities imparting a taste and odor thereto, which impurities, in a prior step of rectification of aqueous alcohol involving removal of water or a dilute alcohol as a bottom product, have a maximum concentration in the range between the maximum concentration point of ethyl isobutyrate and the feed alcohol proof, and which have lesser volatility characteristics than alcohol at the proof of the product withdrawn in the process hereinafter recited, comprising: continuously feeding said alcohol into a rectifying column at a point intermediate the ends; vaporizing said alcohol by the indirect application of heat without substantial addition of water and passing vapors upwardly through the column; refluxing condensed vapors at the top of the column; continuously withdrawing product alcohol from above the point of introduction of feed alcohol at a proof no lower than the feed alcohol, and containing a lower concentration of said residual impurities than the feed alcohol; maintaining a concentration at the bottom of the column above about 110° proof; and continuously withdrawing from substantially the bottom of said column a portion above about 110° proof containing a higher concentration of said residual impurities than the feed alcohol.

4. The method as specified in claim 1 wherein the feed alcohol is about 193° proof and the portion withdrawn from the bottom of the column is at least 183° proof.

5. The method as specified in claim 1 wherein said residual impurities are miscible with water and alcohol and have a boiling point lying between alcohol and water.

EARL D. UNGER.
LE ROY A. SMITH.
HERMAN F. WILLKIE.

REFERENCES CITED

The following references are of record in the file of this patent:

UNITED STATES PATENTS

| Number | Name | Date |
|---|---|---|
| 436,764 | Barbet | Sept. 16, 1890 |
| 992,498 | Guillaume | May 16, 1911 |
| 996,328 | Guillaume | June 27, 1911 |
| 1,292,676 | Barbet | Jan. 28, 1919 |

OTHER REFERENCES

Robinson and Gilliland: "Elements of Fractional Distillation," third edition, published 1939 by McGraw-Hill Book Company, New York, New York, pages 75-80, 95-98 and 169-185.